PARACHUTE PROTECTED AIRCRAFT

Original Filed Feb. 16, 1967 4 Sheets-Sheet 1

INVENTORS
Odell C. Markham
Alan C. Ferguson
BY
H. Gibner Lehmann
AGENT

PARACHUTE PROTECTED AIRCRAFT

Original Filed Feb. 16, 1967 4 Sheets-Sheet 2

INVENTORS
Odell C. Markham
Alan C. Ferguson
BY
H. Gibner Lehmann
AGENT

PARACHUTE PROTECTED AIRCRAFT

Original Filed Feb. 16, 1967 4 Sheets-Sheet 3

INVENTORS
Odell C. Markham
Alan C. Ferguson
BY
H. Gilbert Lehmann
AGENT

PARACHUTE PROTECTED AIRCRAFT

Original Filed Feb. 16, 1967 4 Sheets-Sheet 4

INVENTORS
Odell C. Markham
Alan C. Ferguson
BY H. Gilbert Lehmann
AGENT

United States Patent Office

Re. 27,162
Reissued Aug. 10, 1971

27,162

PARACHUTE PROTECTED AIRCRAFT

Odell C. Markham, 247 Colorado Ave., Bridgeport, Conn. 06605, and Alan C. Ferguson, Perry Ave., Norwalk, Conn. 06850

Original No. 3,395,881, dated Aug. 6, 1968, Ser. No. 616,672, Feb. 16, 1967. Application for reissue Sept. 24, 1968, Ser. No. 767,535

Int. Cl. B64d *25/00*

U.S. Cl. 244—139 13 Claims

Matter enclosed in heavy brackets [ ] appears in the original patent but forms no part of this reissue specification; matter printed in italics indicates the additions made by reissue.

ABSTRACT OF THE DISCLOSURE

A parachute-protected aircraft having a framework comprising fuselage and wings, and an outboard parachute anchored at a top portion of the framework adjacent the center of gravity of the aircraft. The parachute is secured to the aircraft by an anchorage or base member tethered to the parachute and overlying the framework and by attachable fastener devices engaging the base member and adapted to be secured to the framework.

CROSS REFERENCES (1) U.S. Patent No. 1,733,030, (2) U.S. Patent No. 1,823,799, (3) U.S. Patent No. 2,324,045, (4) U.S. Patent No. 2,665,093, (5) U.S. Patent No. 3,051,420, (6) U.S. Patent No. 3,129,913.

BACKGROUND

This invention relates to heavier-than-air craft, and more particularly to craft of this type which carry parachutes for the purpose of providing a safe descent of the craft in an emergency.

Prior parachute-carrying heavier-than-air craft have been characterized by fully built-in systems wherein the fuselage and/or wings are especially designed to house and coact with the parachute means and the associated controls thereof. Each one of such systems has in general constituted much too elaborate and expensive a protective device and one which appeared to be of questionable commercial value, in consequence of which it has not, as a practical matter, been adopted or put into use. Moreover, devices of the above nature were as a rule not suitable for incorporation readily in existing aircraft, since they required recessing into the framework, and costly rebuilding and redesign operations which rendered the aircraft of questionable air worthiness, and which were normally beyond the means of the average plane owner.

SUMMARY

The present invention obviates the disadvantages of such prior devices, and objects of the invention are to provide a novel and improved parachute for an aircraft, which is in the form of an attachment and additionally is constituted as an outboard device whereby it may be easily, quickly and inexpensively installed on existing planes, as well as installed on planes any time after completion, including factory installations. This is accomplished by providing a force-distributing outboard base or anchorage means to which the parachute is tethered, and means including a plurality of attachable fastening devices by which the said base or anchorage may be securely quickly attached in operative outboard position on the top area of the aircraft at the center of gravity thereof.

Other objects of the invention are to provide an improved outboard parachute attachment as above, which is of simple construction, which has few parts and which is inexpensive to purchase and install; to provide an improved device as above, which is reliable in operation, strong and sturdy, and which will adequately break and reduce the falling speed of an aircraft so as to eliminate or minimize damage thereto and injury to occupants; to provide a device in accordance with the foregoing, which will not appreciably adversely alter the aerodynamic balance or air resistance of the aircraft, and which will be resistant to the effects of exposure, weather, etc.; and to provide an improved outboard parachute attachment for aircraft, which is attachable to different makes and types of craft without requiring any appreciable alteration of the craft or the attachment.

Other features and advantages will hereinafter appear.

Figure 1:
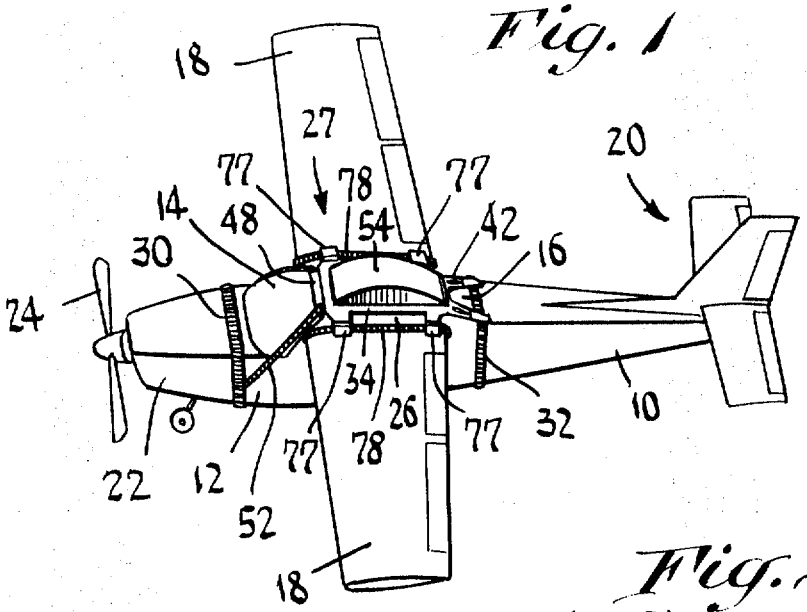
FIG. 1 is a side perspective view of a high-winged, outboard-parachute-protected aircraft as provided by the invention, the parachute being carried above the fuselage.
Figure 2:
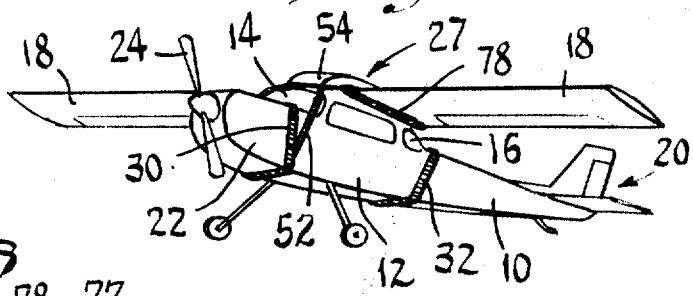
FIG. 2 is a front perspective view of the aircraft of FIG. 1.

Considering first the embodiments of FIGS. 1–4, there is illustrated a high-wing aircraft having an overhead parachute disposed atop the cabin. In accordance with the invention the parachute is outboard and in the form of an attachment, being secured in place by means including straps which extend around major framework portions of the aircraft. As shown, the aircraft fuselage 10 includes a cabin 12 having a windshield 14, a rear window 16 and having secured to its upper frame portion, a pair of wings 18. The aircraft has the conventional tail assemblage 20, engine compartment 22, and front propeller 24. The roof area 26 of the cabin may constitute essentially a continuation of the upper areas of the wings 18.

In accordance with the present invention an outboard parachute assemblage 27 having a parachute 28 is atached to the top of the roof section 26 of the cabin, y means including forward and rear straps 30, 32 respectively which encircle the fuselage 10. The straps 0, 32 may be of any suitable material such as metal, lastic, etc. If made of plastic, the straps 30, 32 are referably constituted of tough synthetic fibers, which ıay or may not be interwoven to produce a web. Plastic bers such as nylon or similar filaments may be advanageously utilized.

Figure 4:
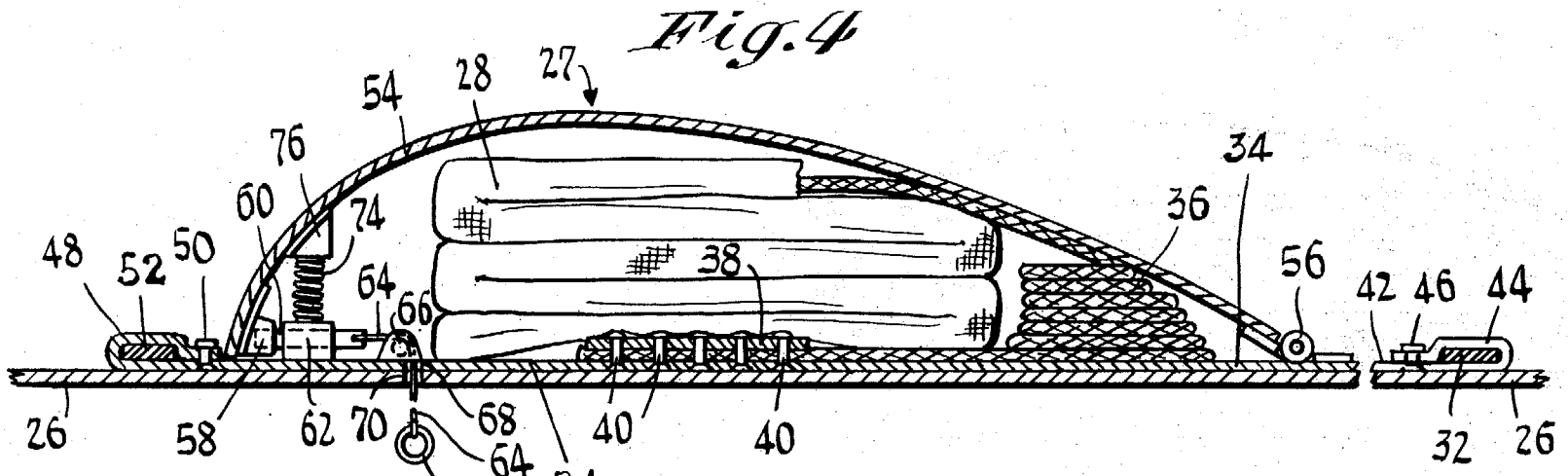
FIG. 4 is a fragmentary vertical sectional view, taken on the line 4—4 of FIG. 3.

Further, in accordance with the invention, the parahute 28 is mounted or carried on a light, relatively large at base or anchorage plate 34 which may be advantaeously constituted of synthetic material, metal reinforced r fiber reinforced, or of stainless steel, tough aluminum lloy or the like. In FIG. 4 the folded parachute assemlage 28 is shown as being connected to the base plate 34 y a tethering rope or web 36 (preferably of synthetic bers) having one end clamped to the base plate 34 by a lamping plate 38 which may be secured by rivets 40 passıg through the plates 34, 38. The tethering rope 36 may ave a sufficient length to enable the parachute 28 to clear nd extend beyond the tail structure 20 of the aircraft fter the parachute has been released. The tethering rope r cable 36 is anchored to the base plate 34 by the clampıg strip 38 at a point which is directly or substantially irectly over or above the center of gravity of the airraft.

The base plate 34 for the parachute is shown as having pair of rearwardly extending arms 42 which straddle the ear window 16 and which have folded-over extremities 4 secured by rivets 46, said extremities constituting enircling eyes through which the rear web or band 32 asses.

The forward portion of the base plate 34 has a foldedver portion 48 secured by rivets 50 and constituting a ınnel through which a halter web or strap 52 passes. The alter web 52 extends forward and downward along side ortions of the windshield 14, and is secured to the front ncircling web 30 in any suitable manner, as by riveted lamps or the like. The attaching straps or strips 30, 32 nd 52 are made very taut, by which the base plate 34 of he outbroad parachute assemblage is securely mounted n the top of the cabin 12. Additionally, epoxy or other uitable cement is used between the base plate 34 and the abin roof 26, and such cement may be used as well with he webs 30, 32 and 52 at strategic locations, to firmly nchor the webs and the base plate.

Pivotally mounted on the base plate 34 is a streamined cover or shell 54, which may be secured to the plate 4 by a hinge structure 56 along its rear edge. At the front, he cover 54 is provided with a latch fitting 58 receiving a lrawbolt 60 slidably carried in a guide 62 which s mounted on the upper surface of the base plate 4. A cable 64 connects with the drawbolt 60 and passes ver a pulley fitting 66 and downward through aligned penings 68, 70 in the plate 34 and roof 26 respectively. The cable 64 has a pull ring 72 which may be grasped nd yanked in an emergency, at the time that the parahute 28 is to be released. A compression spring 74 engages a fitting 76 inside the shell 54 and biases the latter ıpwards whereby it will spring open when released by the eft-to-right movement of the drawbolt 60.

Upon this movement occurring, the shell 54 can swing lockwise through an arc of 180°, and the parachute 28 vill be exposed and released for opening, this action eing assisted by the air stream flowing past the roof 26 of he cabin. As the parachute 28 travels past the tail structure 20 of the plane and unfolds, being impelled in such lirection by the air stream, the slack will be taken from he tethering rope or cable 36, whereupon the opening arachute will exert its lifting or retarding effect on the ase plate 34. Since the plate 34 is very securely anchored o the framework of the aircraft, namely the fuselage 10 s seen in FIGS. 1 and 4, the speed of falling of the aircraft will be broken and instead the craft will drop more slowly as restrained by the action of the parachute, minimizing the likelihood of damage to it, and of injury to the occupants.

It will be noted that the halter web 52 extends downward from the front portion of the base plate 34 at a relatively steep angle, and the rear web 32 extends vertically downward from the extremities of the rear arms 42 of the base plate. In consequence, in conjunction with the epoxy cement, the base plate 34 will be able to withstand a considerable jolt or tug as the parachute unfolds and applies its restraint to the tethering cable 36.

Considering the relatively light weight of aircraft of the kind shown, together with the downspeed restraint resulting from the large wing and fuselage area, a strongly constructed parachute having a tethering cable which may be somewhat elastic in conjunction with the strong attachment means comprising the base plate and encircling tough webs will be able to adequately cope with the task of bringing a disabled aircraft down at a greatly reduced, comparatively safe speed, all without danger of failure of the fastening means or parachute.

Figure 3:
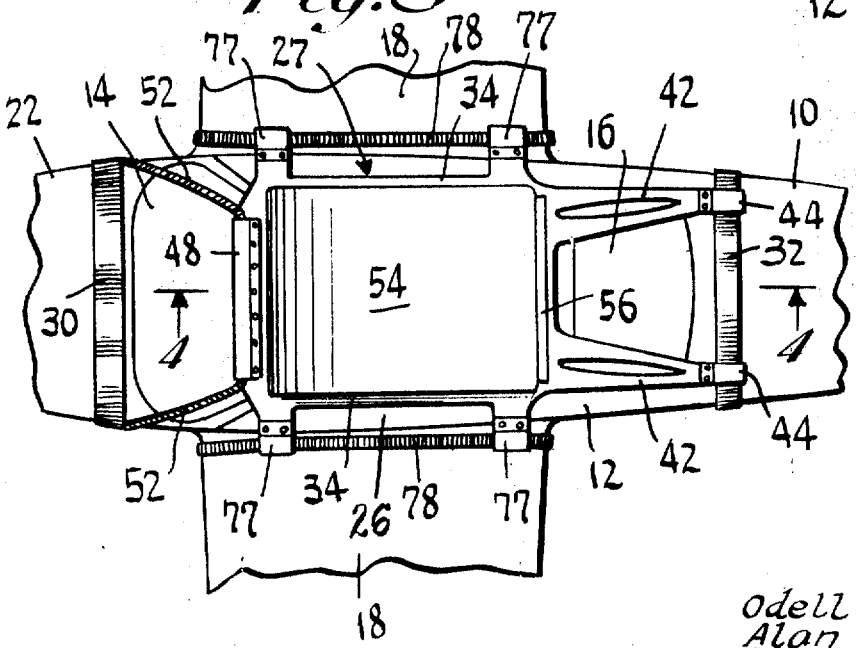
FIG. 3 is a fragmentary top plan view of the central portion of the aircraft, in the region of the center of gravity thereof.

Synthetic fibers or metal strands as produced by present day technology will be found to have adequate strength, when used for the bands 30, 32 and 52. Also, alloy metals can be used to make the base plate 34 of sufficient strength, together with embossing of the arms 42 as illustrated in FIG. 3. Likewise, the tethering cable 36 can be constructed to have adequate strength for the stresses likely to be encountered in the emergency use of the parachute attachment.

Additionally the base plate 34 can have pairs of side arms 77 which overlie the wings 18 and are strapped thereto by bands 78 which encircle the wings. In some circumstances the side arms 77 may constitute the sole fastening of the plate 34. Or, the plate may be secured without the provision of the side arms 77. Also, all of the straps shown in FIG. 3 and associated arms, eyes, tunnels, etc. may be utilized. In other words, the fastening of the plate 34 can be either to the wings 18, or to the fuselage 10, or to both.

Figure 5:
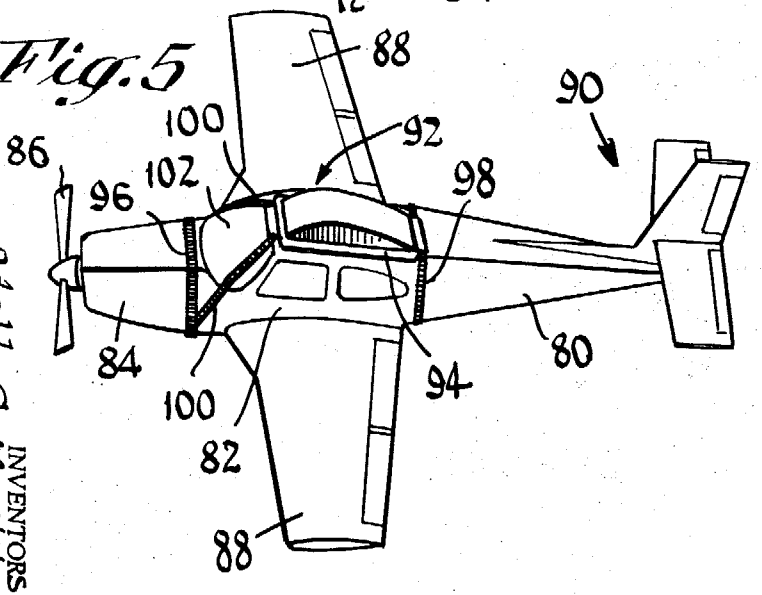
FIG. 5 is a side perspective view of a low-winged parachute-protected aircraft constituting another embodiment of the invention.

Another embodiment of the invention is illustrated in FIG. 5, wherein there is shown a low-wing aircraft having a fuselage 80, cable 82, engine compartment 84, propeller 86, wings 88 and tail structure 90. An outboard parachute assemblage 92 similar to the assemblage having the parachute 28, is secured to the roof of the cabin 82 by means of a metal or plastic base plate 94 strapped in place by fuselage encircling straps 96, 98 and a front halter strap 100. As shown, the halter strap 100 extends forward and downward along side portions of the windshield 102, as already described in connection with FIGS. 1–4. Further details of the organization illustrated in FIG. 5 may be similar to those already described in connection with the previous figures.

Figure 6:
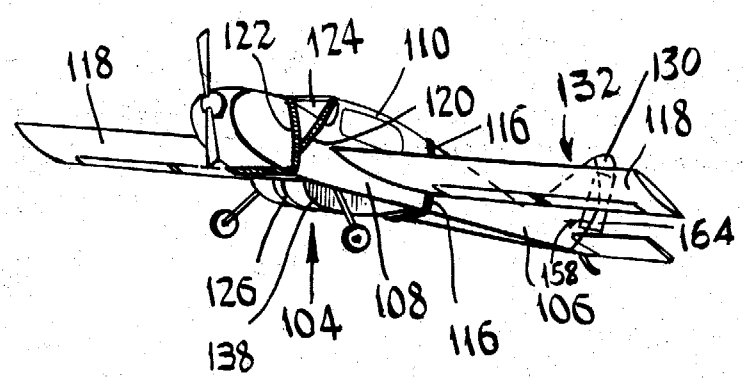
FIG. 6 is a front perspective view of a parachute-protected aircraft constituting yet another embodiment of the invention, wherein the parachute is carried below the fuselage.
Figure 7:
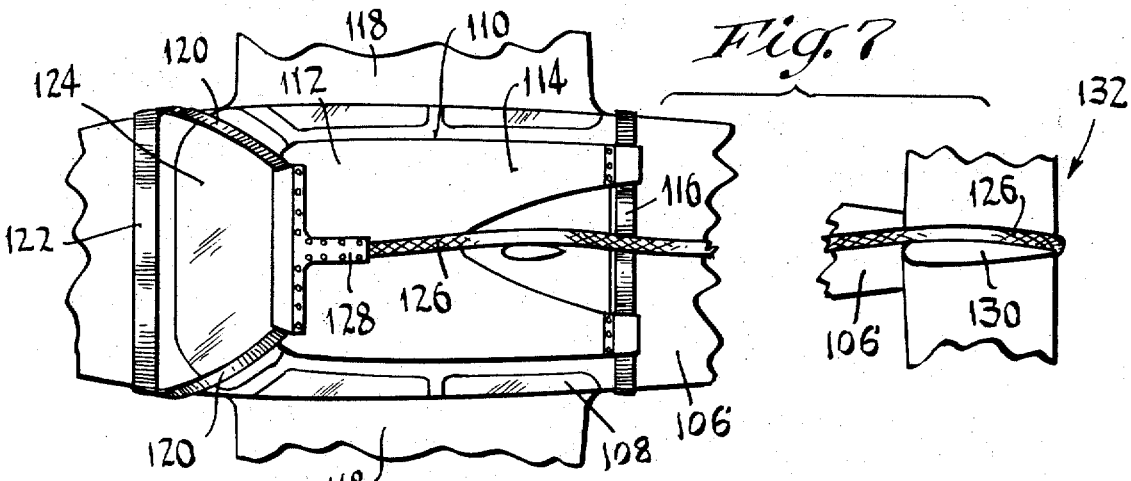
FIG. 7 is a fragmentary top plan view of the center and tail portions of the aircraft of FIG. 6.

Yet another embodiment of the invention is illustrated in FIGS. 6–9, showing a low-wing aircraft having an outboard parachute assemblage 104 attached to the undersurface of the fuselage *or framework*, and cabin 106, 108 of the craft. Referring to FIG. 7, the cabin roof 110 has mounted on it an anchorage plate 112 having rearwardly extending arms 114 the extremities of which encircle a rear strap 116 passing around the fuselage 106 to the rear of the wings 118. The forward edge portion of the anchorage plate 112 is held down by a halter web 120 which extends downward and forward and is attached to lower portions of a forward, encircling strap 122 extending around the fuselage forwardly of the wings 118. The halter strap 120 extends along side portions of the windshield 124.

Attached to the anchorage plate 113 is a tethering web or rope 126, fastened by a clamping plate 128. The clamping plate 128 is located at a point substantially directly above the center of gravity of the aircraft. The tethering web 126 passes rearward along and is releasably adhered to the top surface of the fuselage 106 to one side of the vertical member or fin 130 of the tail structure 132, and then forward under and releasably adhered to the fuselage 106, terminating at the parachute assemblage 104.

Figure 8:
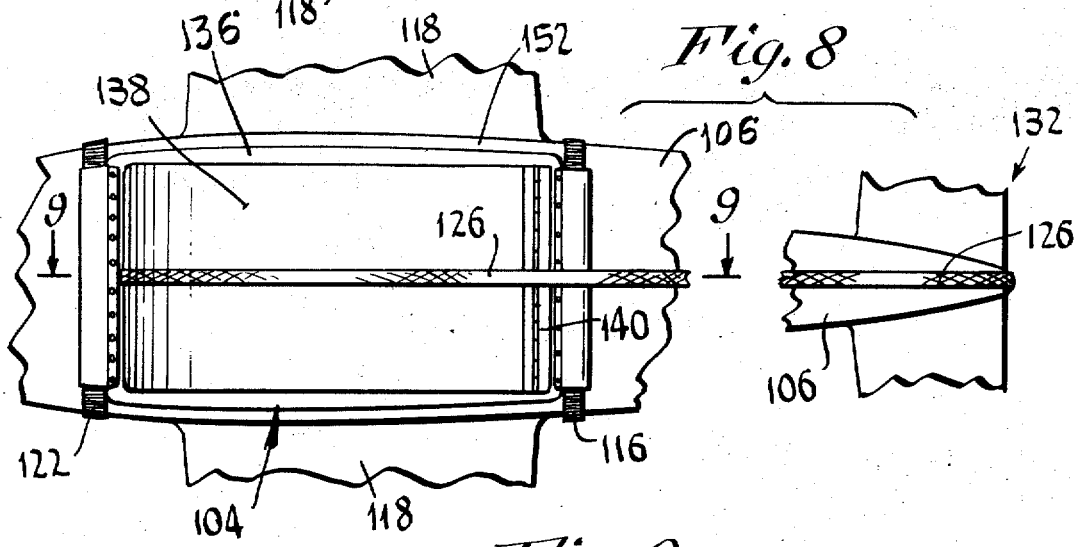
FIG. 8 is a fragmentary bottom plan view of the center and tail portions of the aircraft of FIGS. 6 and 7.
Figure 9:
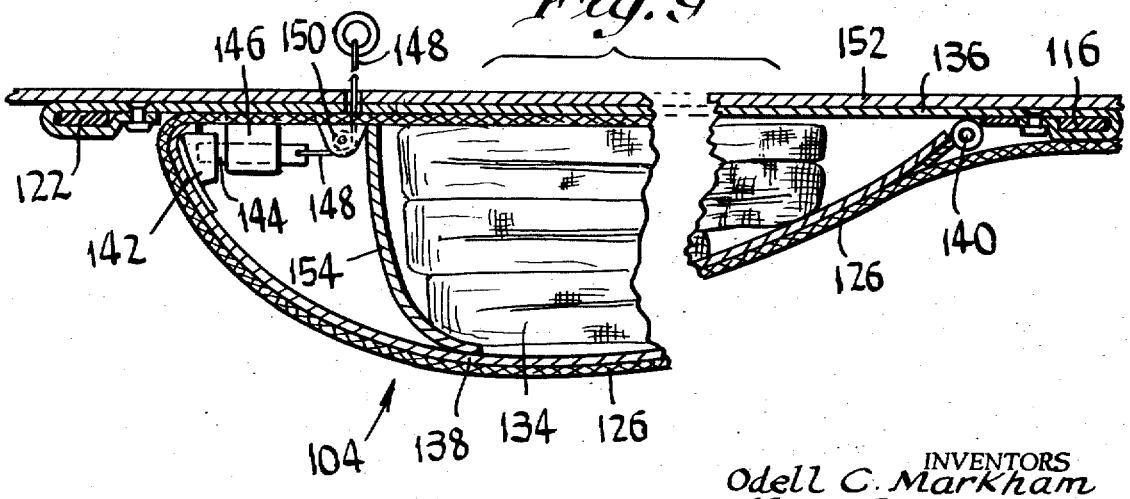
FIG. 9 is a fragmentary sectional view taken on the line 9—9 of FIG. 8.

Referring to FIG. 9, the parachute assemblage 104 includes a folded parachute 134 which is *compacted by the folding to enable it to occupy the smallest possible space and, as can be seen from FIGS. 4 and 9, to have a center of weight not greatly distant from any exterior portions of the parachute. The parachute 134 is* held below a metal mounting plate 136 secured at its front and rear edges respectively to the encircling webs 122 and 116. Enclosing the folded parachute 134 is a streamlined shell *or housing* 38 [which] *which may be constituted mainly of a movably mounted cover member constituting the shell, said cover member being thereby exposed exteriorly of the aircraft framework and being* [may be] hinged at 140 to the mounting plate 136 along the rear edge of the shell. The forward portion of the shell 138 has a *releasable fastener device under the control of the aircraft operator and comprising a* clasp fitting 142 engaged by a drawbolt 144 carried in a guide 146 attached to the mounting plate 136 and connected with a release cable 148 passing over a pulley fitting 150 and upward through suitable openings into the cabin or cockpit of the aircraft. The bottom wall of the fuselage 106 is indicated at 152 in FIG. 9. A partition piece 154 separates the folded parachute 134 from the drawbolt mechanism. *The streamlined housing or shell 138, as seen in FIGS. 8 and 9, completely conceals the parachute 134 and isolates it from the exterior air space. It further provides for easy accessibility of the parachute and removal of the same from the aircraft, all without requiring large, parachute accommodating openings in the aircraft framework, as may be readily understood from the showings of FIGS. 6, 8 and 9. In FIG. 8 the framework or fuselage 106, and the bottom wall 152 thereof are seen to be devoid of any openings large enough to pass the parachute.*

*It will be noted, from FIG. 8, that the housing 138 and parachute 134 are located directly vertically below the aircraft wings 118, so the bulk of the parachute weight is disposed vertically below the wings, thereby no disturbing the stability designed into the aircraft initially. It will be understood that the maintaining of such stability in an aircraft is especially important.*

The tethering web or rope 126 passes forwardly under the streamlined shell 138 and between the front end portion of the shell and the mounting plate 136 so as to extend into the interior of the shell as shown in FIG. 9, where it is attached to the folded parachute 134.

Referring to FIGS. 7 and 8, the elevators (not shown) of the tail structure 132 are disposed in the broken-away portions of the horizontal plane thereof whereby they are spaced from the tethering web 126 and vertical fin 130. Also, as seen in FIG. 6, the rudder 164 is disposed wholly above and is spaced from the web 126 and horizontal plane of the tail structure. Thus, the web will not interfere with any of the movable control surfaces of the tail structure 132 during normal flight conditions.

During an emergency condition involving the aircraft, the cable 148 is yanked, sliding the drawbolt 144 backward whereupon the shell 138 is released for swinging downward counterclockwise movement about the hinge 140. The parachute 134 will fall away and open, pulling the tethering web 126 taut, whereupon the descent of the aircraft will be slowed. The air stream past the fuselage will carry the paarchute 134 backward beyond the tail 132, and the tethering web 126 will accordingly be free of the tail structures.

Figure 10:
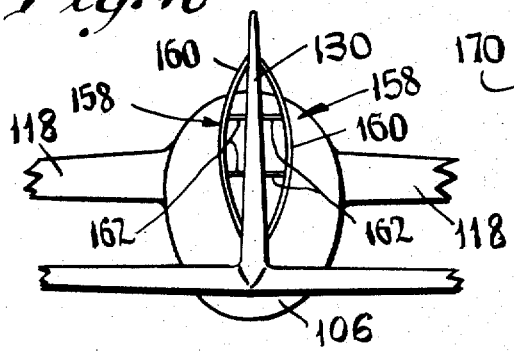
FIG. 10 is a fragmentary tail view of the aircraft of FIG. 6, illustrating a fin-carried deflector means to prevent entanglement of the tethering cable of the parachute with the tail.

To further insure against entanglement of the parachute, the tail fin 130 may be provided with bowed guards 158 on its opposite sides, as shown in FIGS. 6 and 10. The guards 158 are shown as comprising curved strips 160 and horizontal struts 162, these being preferably constructed to have a drag-reducing aerodynamic section as will be understood. The guards 158 tend to prevent the rudder 164 from picking up the tethering cable 126 when the parachute is released.

Figure 11:
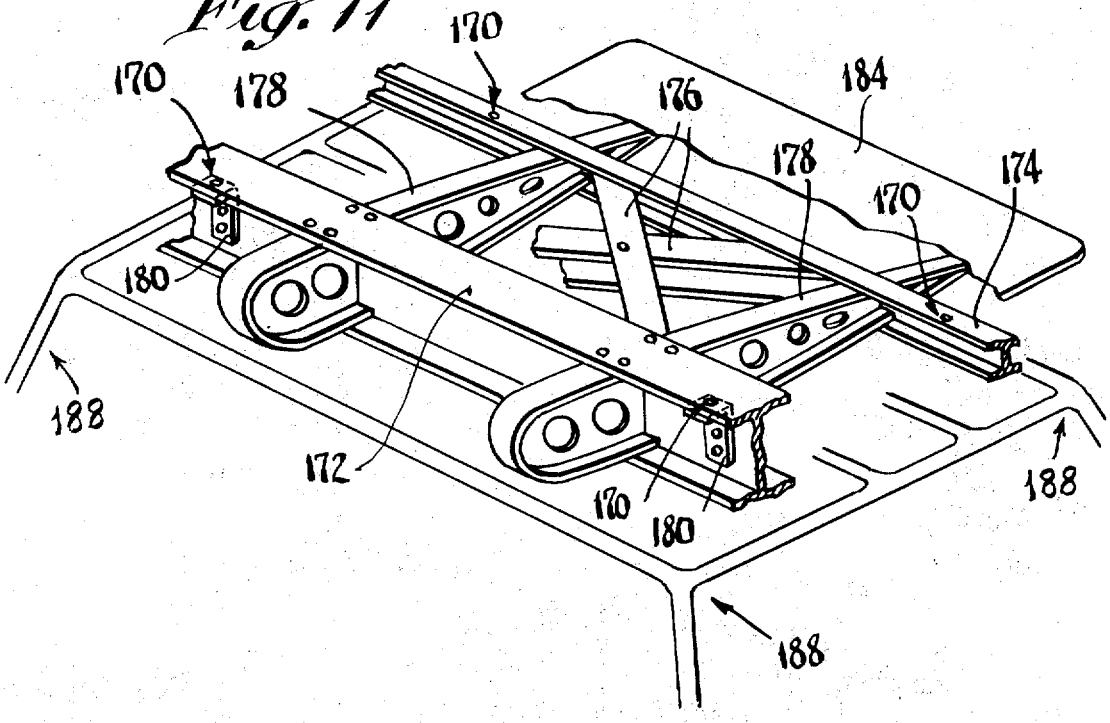
FIG. 11 is a fragmentary perspective view of an aircraft framework, illustrating an alternative type, built-in fastening device.
Figure 12:
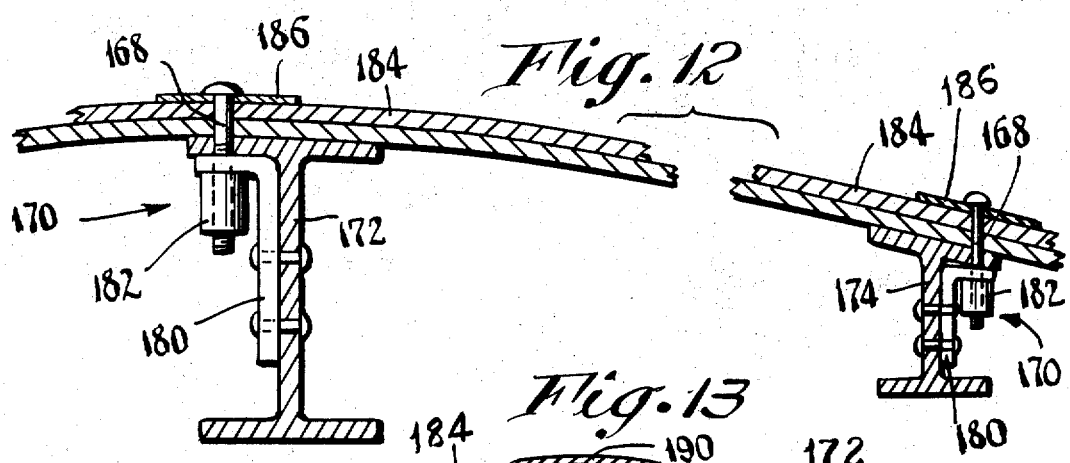
FIG. 12 is a fragmentary section through the wing spars of FIG. 11, showing details of the alternative fastening devices.
Figure 13:
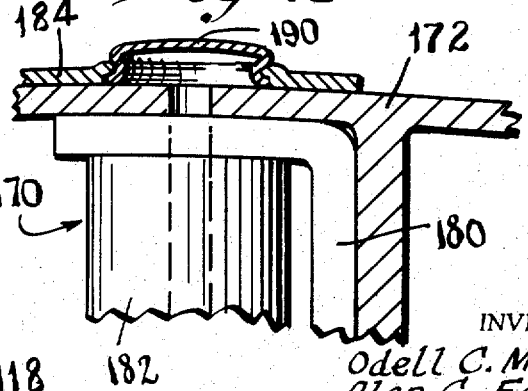
FIG. 13 is a fragmentary section showing a removable closure piece covering a built-in fastening device for the base or anchorage means.

In accordance with the invention, alternative easily-attachable fastening devices may be utilized to secure the base or anchorage plate to the aircraft, as shown in FIGS. 11–13. These alternative fastening devices comprise threaded bolts 168, and cooperable threaded sockets 170, the latter being rigidly permanently attached to the aircraft framework.

In FIG. 11 the said framework is shown as comprising wing spars 172, 174, cross braces 176 and air foil members 178. Secured to the spars 172, 174 are brackets 180 having threaded collars or sockets 182 into which the bolts 168 are screwed. The base or anchorage plate 184 may have pads 186 welded to them for increasing the strength, and such plate may in general be constructed like the plate 34 but without the arms for accommodating the tie webs. In FIG. 11 the cabin framework 188 is shown in part.

The sockets 170 are preferably recessed in the space outlined by the framework shown in FIG. 11, and if no parachute is used, may be covered and concealed by removable disks 190, as shown in FIG. 13. The aircraft may leave the factory in this manner, with the parachute installation being effected at a later time. The bolts 168 themselves may be used as the cover pieces for the sockets.

It will now be understood from the foregoing that we have provided a novel and improved aircraft with an outboard parachute, the latter being so constituted that it may be applied to existing used aircraft or to factory-new aircraft without requiring any considerable modification of the same. The parachute assemblage is secured in place by bolts or by straps, either with or without the addition of cement or epoxy glue, and the combination of the bolts or straps and the base plate in the organization shown enables a strong and reliable attachment of the parachute to the aircraft to be effected without requiring alteration of the frame or other structural members which would involve considerable rebuilding of the aircraft and place the same in an experimental category by virtue of the modification of the structure involved. Instead, with the illustrated arrangement comprising either the bolts and sockets or the encircling straps, in combination with an anchorage plate of appreciable strength, a reliable securement of the attachment to the aircraft is possible. The attachment is of relatively light weight, and by the use of present day synthetic fibers and improved alloys, can be so constituted as to adequately perform the function required of a relatively large parachute.

Variations and modifications may be made within the scope of the claims, and portions of the improvement may be used without others.

We claim:

1. A parachute-protected aircraft comprising, in combination:

(a) an aircraft framework including a covering and comprising fuselage and wings, (b) a parachute *which is folded to enable it to be compacted into the smallest possible space,* [wherein the improvement comprises:]

(c) said parachute being disposed outside the covering of the aircraft frame *and the bulk of the parachute weight being located directly under the plane defined by the aircraft wings,*

(d) [a base member] *anchorage means* outside *of and above* said framework covering, to which the parachute is anchored, and (e) means including attachable fastener devices engaging the [base member] *anchorage means* and attachable to the framework of the aircraft, for securing the [base member] *anchorage means* thereto at a location substantially adjacent and above the center of gravity of the aircraft, (f) a tether rope securing the parachute to the base member, (g) and means mounting the parachute under the [fuselage] *framework* of the aircraft, *said means comprising a streamlined housing disposed exteriorly of the aircraft framework and including a movable cover member the removal of which releases the parachute from the housing,*

*(h) a releasable fastener device under the control of the aircraft operator, for normally securing the cover member against movement with respect to the aircraft framework and for releasing the cover member so as to free the parachute for opening,*

*(i) said streamlined housing completely concealing the parachute and isolating it from exterior air space, and further providing for easy accessibility to the parachute and removal of the same from the aircraft framework without requiring openings in the latter large enough to pass the parachute therethrough,*

[(h)] *(j)* said tether rope extending backward from the base member along the top of the fuselage to the tail of the aircraft, and extending from the tail forward along the bottom of the fuselage to the parachute.

2. A parachute-protected aircraft as in claim 1, wherein:

(a) a mounting member is provided under the [fuselage], *framework,* on which the [parachute] *housing* is carried, (b) [a streamlined] *said* cover *member being* movably secured *with respect to* the *said* mounting member, and (c) [manually operable latch means for] *said fastener device* releasing said cover *member* for movement with respect to the base member.

3. A parachute-protected aircraft as in claim 1, wherein:

(a) a mounting member is provided under the [fuselage] *framework,* on which the *housing* [parachute] is carried, (b) said attachable fastener devices comprising flat strips engaging and securing the mounting member to the [fuselage] *framework.*

[4. A parachute-protected aircraft as in claim 3, wherein:

(a) the base and mounting members are plates of relatively large expanse, to the edges of which the flat strips are secured.]

[5. A parachute-protected aircraft as in claim 1, wherein:

(a) the base member comprises a plate of relatively large expanse, to the edges of which the fastener devices are secured.]

6. A parachute-protected aircraft as in claim *17* wherein:

(a) the base member directly overlies and closely conforms to the contour of the covering of the fuselage.

[7. A parachute-protected aircraft as in claim 1, and including:

(a) a streamlined cover movably secured to the means mounting the parachute, and (b) manually operable latch means for releasing said cover for movement with respect to the parachute mounting means.]

8. A parachute-protected aircraft comprising, in combination:

(a) an aircraft *framework* including a fuselage, wings disposed intermediate the ends of the fuselage and a tail disposed at the back end of the fuselage, (b) a parachute, wherein the improvement comprises:

(c) means releasably carrying the parachute on the [fuselage] *framework with the bulk of its weight being disposed at a location directly, vertically below the plane of the wings, said plane having the outline of said wings* for release from the underside [thereof] *of the framework,*

(d) an anchorage secured to the aircraft and disposed at a location substantially adjacent and above the center of gravity of the aircraft, and (e) a tether rope having a length greater than the distance from the aircraft wings to the tail, securing the parachute to the anchorage, (f) said tether rope extending backward from the anchorage along the upper portion of the fuselage to the tail of the aircraft, and extending from the tail forward along the bottom portion of the fuselage to said parachute.

9. A parachute-protected aircraft as in claim 8, wherein:

(a) said parachute-carrying means comprises a streamlined housing secured to the underside of the [fuselage] *framework,* in which the parachute is disposed.

10. A parachute-protected aircraft as in claim 8, and further including:

(a) guard devices disposed on opposite sides of the tail adjacent the rudder, for minimizing the likelihood of the tether rope becoming entangled with the rudder.

[11. A parachute-protected aircraft as in claim 10, wherein:

(a) said guard devices comprise rails attached to and spaced from the tail fin.]

12. A parachute-protected aircraft as in claim 8, wherein:

(a) the anchorage comprises a base plate of appreciable expanse, disposed over the fuselage, and (b) straps extending around the fuselage, for securing the anchorage plate thereto.

13. A parachute-protected aircraft as in claim 8, wherein:

(a) the tether rope comprises a flat web, (b) said web being releasably secured to the exterior fuselage surfaces.

*14. A parachute-protected aircraft as in claim 1 and further including:*

*(a) means isolating said fastener device from the folded parachute.*

*15. A parachute-protected aircraft comprising, in combination:*

*(a) an aircraft framework including a covering and comprising fuselage and wings,*

*(b) a parachute, wherein the improvement comprises:*

*(c) said parachute being disposed outside the covering of the aircraft frame,*

*(d) a base member outside said framework covering, to which the parachute is anchored, and*

*(e) means including attachable fastener devices engaging the base member and attachable to the framework of the aircraft, for securing the base member thereto at a location substantially adjacent and above the center of gravity of the aircraft,*

*(f) a tether rope securing the parachute to the base member,*

*(g) and means mounting the parachute under the framework of the aircraft,*

*(h) said tether rope extending backward from the base member along the top of the fuselage to the tail of the aircraft, and extending from the tail forward along the bottom of the fuselage to the parachute,*

*(i) a mounting member under the framework, on which the housing is carried,*

*(j) said attachable fastener devices comprising flat strips engaging and securing the mounting member to the framework,*

*(k) said base and mounting members being plates of relatively large expanse, to the edges of which the flat strips are secured.*

*16. A parachute-protected aircraft comprising, in combination:*

(*a*) *an aircraft framework including a covering and comprising fuselage and wings,*

(*b*) *a parachute, wherein the improvement comprises:*

(*c*) *said parachute being disposed outside the covering of the aircraft frame,*

(*d*) *a base member outside said framework covering, to which the parachute is anchored, and*

(*e*) *means including attachable fastener devices engaging the base member and attachable to the framework of the aircraft, for securing the base member thereto at a location substantially adjacent and above the center of gravity of the aircraft,*

(*f*) *a tether rope securing the parachute to the base member,*

(*g*) *and means mounting the parachute under the framework of the aircraft,*

(*h*) *said tether rope extending backward from the base member along the top of the fuselage to the tail of the aircraft, and extending from the tail forward along the bottom of the fuselage to the parachute,*

(*i*) *said base member comprising a plate of relatively large expanse, to the edges of which the fastener devices are secured.*

*17. A parachute-protected aircraft comprising, in combination:*

(*a*) *an aircraft framework including a fuselage, wings disposed intermediate the ends of the fuselage and a tail disposed at the back end of the fuselage,*

(*b*) *a parachute, wherein the improvement comprises:*

(*c*) *means releasably carrying the parachute on the framework for release from the underside thereof,*

(*d*) *an anchorage secured to the aircraft and disposed*

*at a location substantially adjacent and above the center of gravity of the aircraft, and*

(*e*) *a tether rope having a length greater than the distance from the aircraft wings to the tail, securing the parachute to the anchorage,*

(*f*) *said tether rope extending backward from the anchorage along the upper portion of the fuselage to the tail of the aircraft, and extending from the tail forward along the bottom portion of the fuselage to said parachute,*

(*g*) *guard devices disposed on opposite sides of the tail adjacent the rudder, for minimizing the likelihood of the tether rope becoming entangled with the rudder,*

(*h*) *said guard devices comprising rails attached to and spaced from the tail fin.*

References Cited

The following references, cited by the Examiner, are of record in the patented file of this patent or the original patent.

UNITED STATES PATENTS

| | | | |
|---|---|---|---|
| 1,233,087 | 7/1917 | MacLean | 244—139 |
| 1,552,370 | 9/1925 | Williams | 244—139 |
| 1,556,502 | 10/1925 | Doucett | 244—139 |
| 1,731,491 | 10/1929 | Grissom et al. | 244—139 |
| 2,392,448 | 1/1946 | Atherton | 244—139 |
| 2,458,212 | 1/1949 | Smith | 244—139 |
| 3,499,623 | 3/1970 | Markham et al. | 244—139 |

MILTON BUCHLER, Primary Examiner

J. E. PITTENGER, Assistant Examiner